United States Patent [19]

Fitzsimmons

[11] 3,732,615
[45] May 15, 1973

[54] METHOD FOR PRODUCING STANDING WAVE OF SOLDER AND PROTECTIVE FILM MEANS

[75] Inventor: Robert D. Fitzsimmons, Windham, N.H.

[73] Assignee: Gale Systems, Inc., Andover, Mass.

[22] Filed: May 14, 1971

[21] Appl. No.: 143,461

Related U.S. Application Data

[62] Division of Ser. No. 782,824, Dec. 11, 1968, Pat. No. 3,589,590.

[52] U.S. Cl. ................................................29/503
[51] Int. Cl. ........................B23k 31/02, B23k 35/12
[58] Field of Search .......................29/503; 228/37; 137/154; 118/429; 117/114

[56] References Cited

UNITED STATES PATENTS

| | | | |
|---|---|---|---|
| 2,869,497 | 1/1959 | Lehner | 228/37 |
| 2,993,272 | 7/1961 | Carlzen et al. | 29/503 |
| 3,037,274 | 6/1962 | Hancock | 29/471.1 |
| 3,058,441 | 10/1962 | Walker et al. | 228/33 |
| 3,190,527 | 6/1965 | Fordoskegyi | 118/429 X |
| 3,198,414 | 8/1965 | Fordoskegyi | 228/37 |
| 3,303,983 | 2/1967 | Patrick et al. | 29/503 X |
| 3,438,386 | 4/1969 | Diggios et al. | 137/154 |
| 3,398,873 | 8/1968 | Wegener et al. | 228/37 |
| 3,445,919 | 5/1969 | Saba | 228/37 X |
| 3,452,916 | 7/1969 | Andis | 228/36 |
| 3,589,590 | 6/1971 | Fitzsimmons | 228/37 |
| 3,605,244 | 9/1971 | Osborne et al. | 228/37 X |

Primary Examiner—J. Spencer Overholser
Assistant Examiner—Ronald J. Shore
Attorney—Fulwider Patton Rieber & Utecht

[57] ABSTRACT

A method for producing a standing wave of solder and oil compound of a selected ratio and including the steps of placing molten solder in a soldering apparatus of the type that includes a sump having a fountain disposed therein and formed with an inlet disposed in the lower portion of such sump and an outlet disposed in the lower portion thereof and filling such sump with sufficient solder to cover the inlet. A layer of oil compound or other protective film means having a lesser specific gravity than the solder is then placed on the solder and the solder is pumped through the fountain at a rate sufficient to cause the solder emitted from the outlet to form a standing wave and then spill downwardly around the fountain and through the layer of oil compound at a rate sufficient to pull a sufficient amount of oil compound downwardly therewith and into the inlet to cause the mixture passing through the fountain to maintain the selected ratio of solder to oil compound.

5 Claims, 7 Drawing Figures

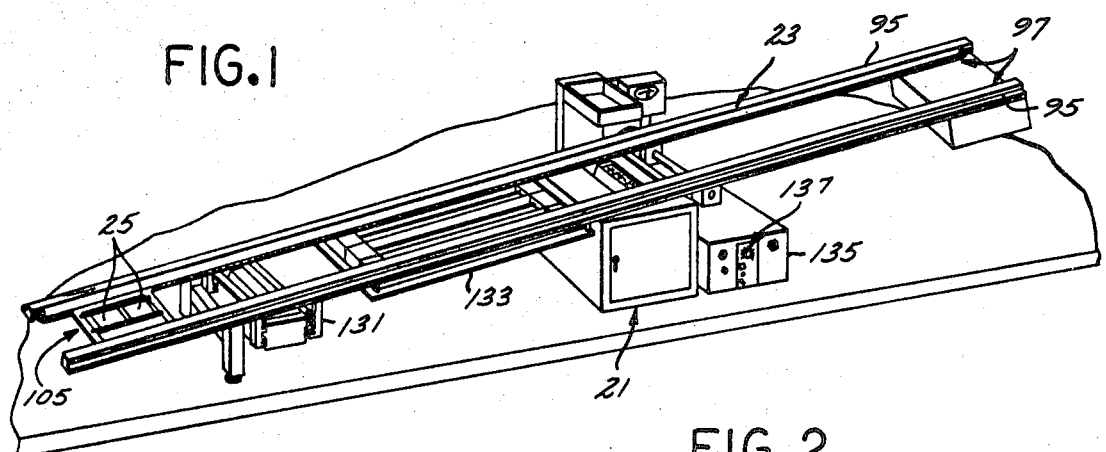
FIG.1
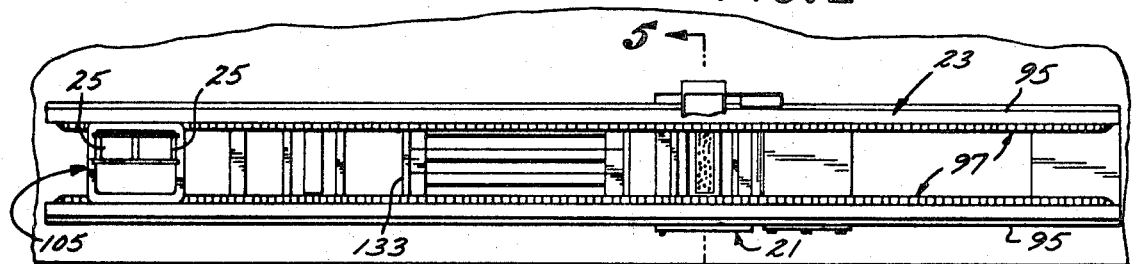
FIG.2
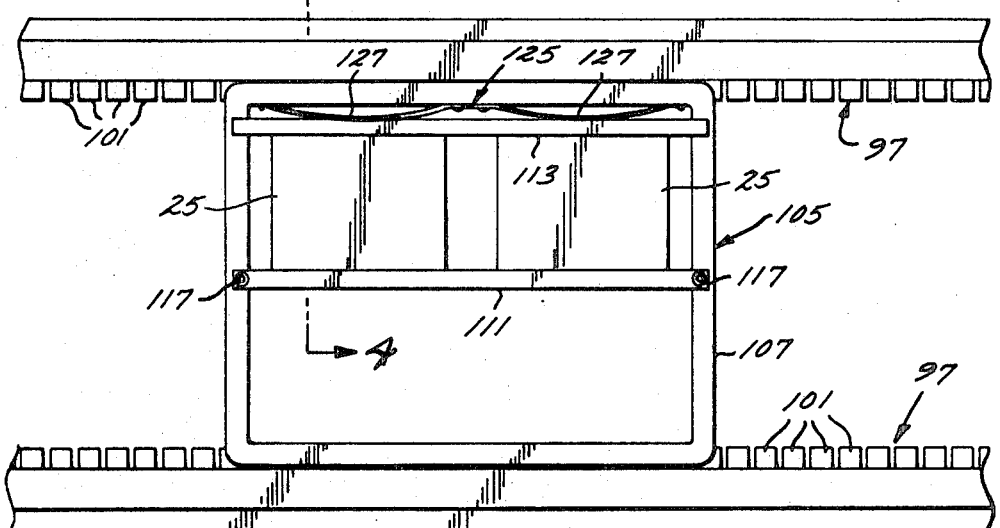
FIG.3
FIG.4
INVENTOR.
ROBERT D. FITZSIMMONS
BY Fulwider, Patton, Rieber, Lee and Utecht
ATTORNEYS

INVENTOR.
ROBERT D. FITZSIMMONS

METHOD FOR PRODUCING STANDING WAVE OF SOLDER AND PROTECTIVE FILM MEANS

CROSS-REFERENCE TO RELATED APPLICATION

This application is a divisional application of U. S. Ser. No. 782,824, filed Dec. 11, 1968, and now U.S. Pat. No. 3,589,590.

BACKGROUND OF THE INVENTION

1. Field of the Invention

The present invention relates generally to methods for soldering electrical components together and more particularly to a method for producing wave of a selected ratio of solder to oil compound.

2. Description of the Prior Art

Numerous soldering methods have been proposed for producing a standing wave composed of a desired ratio of molten solder and oil compound. Further, soldering methods of this type have been proposed which employ a pump disposed in a solder-receiving sump and having an inlet conduit which branches into a solder tube disposed in the lower portion of such sump and an oil tube in the form of a stand pipe projecting upwardly in the sump to terminate in an oil inlet disposed in a layer of oil compound floating on molten solder disposed in the sump. Methods of this type suffer the shortcoming that a valve must be installed in either the solder tube or stand pipe to enable adjustment of the solder to oil ratio and such valves must be of a quality that will withstand relatively high temperatures. Further, such valves frequently gradually collect residue therein during use thereby effecting an unwanted alteration in the solder to oil ratio.

SUMMARY OF THE INVENTION

The method of present invention is characterized by placing molten solder in a sump of a soldering device of the type that includes a fountain installed in such sump and including an inlet disposed in the lower portion thereof. The sump is filled sufficiently with solder to cover the inlet and a layer of floating oil is then placed on such solder and the solder is pumped through the fountain at a rate which will cause the solder emitting from the outlet thereof to form a standing wave and spill downwardly around such fountain at a rate sufficient to draw a sufficient quantity of oil therewith and into the inlet to produce the desired ratio of oil to solder in such wave.

The objects and advantages of the present invention will become apparent from a consideration of the following detailed description when taken in conjunction with the accompanying drawings.

BRIEF DESCRIPTION OF THE DRAWINGS

FIG. 1 is a perspective view of a soldering apparatus that may be utilized in practicing the method of present invention;

FIG. 2 is a top view of the soldering apparatus shown in FIG. 1;

FIG. 3 is a partial top view, in enlarged scale, of the soldering apparatus shown in FIG. 1;

FIG. 4 is a broken vertical sectional view, in enlarged scale, taken along the line 4—4 of FIG. 3;

DESCRIPTION OF THE PREFERRED EMBODIMENT

Figure 5:
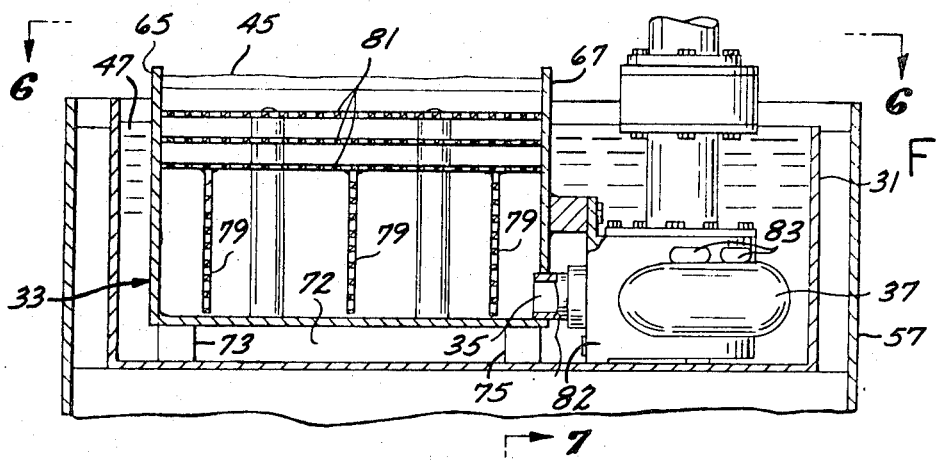
FIG. 5 is a vertical sectional view, in enlarged scale, taken along the line 5—5 of FIG. 2.
Figure 7:
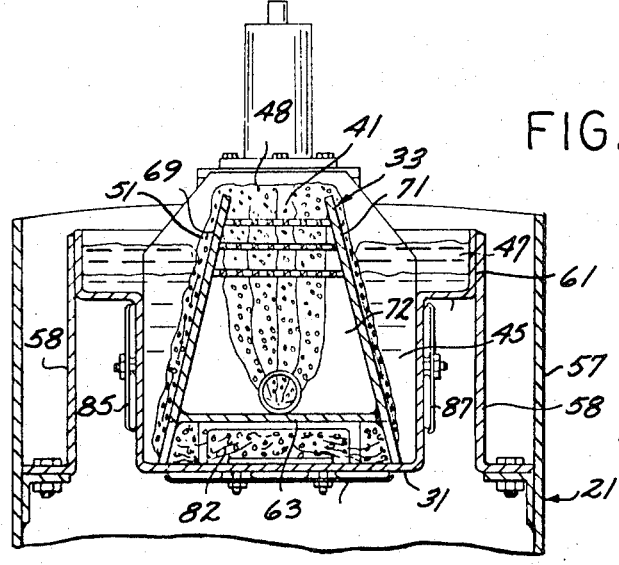
FIG. 7 is a vertical sectional view taken along the line 7—7 of FIG. 6.

Referring to FIG. 1, the method of present invention may conveniently be practiced with a soldering device, generally designated 21, having a conveyor, generally designated 23, disposed thereover for carrying the electrical components, which may be in the form of circuit boards 25 (FIG. 3), therepast. Referring to FIGS. 5 and 7, the soldering device 21 includes a sump 31 which has a fountain, generally designated 33, disposed therein. The fountain includes an inlet 35 in its lower portion which is connected with the outlet of a variable speed pump 37 and such fountain terminates at its upper extremity in a horizontally disposed rectangularly shaped outlet 41. Consequently, the sump 31 may be partially filled with molten solder 45 as shown in FIG. 7 and a layer of oil compound 47 having a lesser specific gravity than such solder disposed thereon. The pump 37 is then operated at a speed sufficient to draw solder in the inlet 82 and feed it upwardly through the fountain 33 to cause it to pass upwardly through the outlet 41 to form a standing wave 48 thereover and to then spill downwardly about the sides of the fountain 33 to form streams 51 which have a sufficient flow rate to draw a sufficient amount of the oil compound 47 downwardly therewith and into the pump 37 to be fed into the fountain inlet 35 and produce an oil-solder mix of the desired ratio in the wave 48.

It will be appreciated that the oil compound 47 not only floats on the solder 45 in the sump 31, but mixes with the circulating solder to be passed upwardly into the standing wave 48 and will be buoyed toward the top surface thereof to also form a protective film on such wave to prevent oxidation thereof and consequent film formation. It will be appreciated that the oil compound may be composed of an actual oil substance such as Peblum Oil as manufactured by Shell Oil Company, or may be a substance such as wax which will mix with the solder and form the protective film. Accordingly, this invention is not intended to be limited to an oil compound but comprehends any protective film means which is readily substitutable for the oil compound.

With continued reference to FIGS. 1, 5 and 7, the soldering device 21 includes a cabinet 57 having the sump 31 mounted in the upper extremity thereof by means of mounting brackets 58 (FIG. 7). Referring to FIG. 7, the sump 31, in transverse cross section, is somewhat in the shape of an inverted bell to form an enlarged in cross section upper portion 61.

Figure 6:
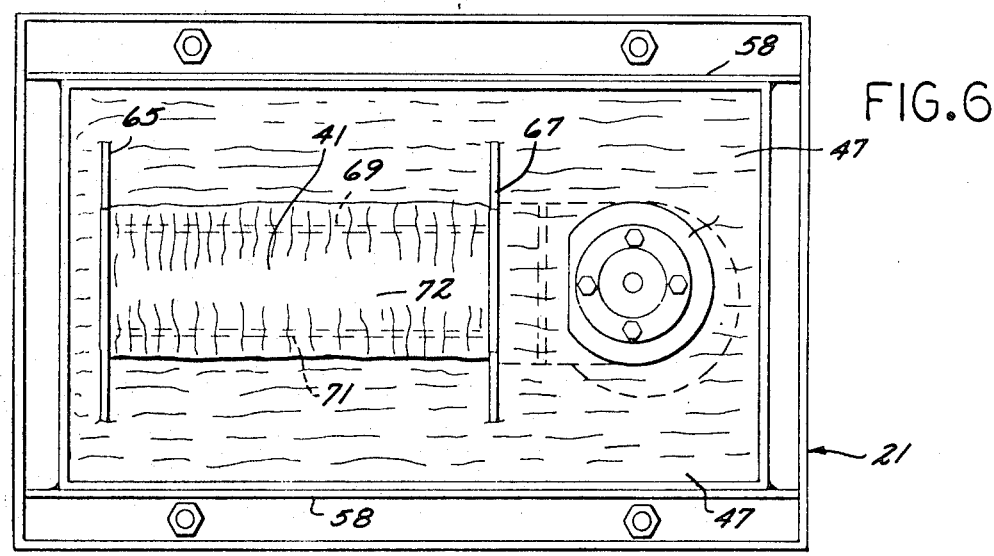
FIG. 6 is a top plan view taken along the line 6—6 of FIG. 5.

The fountain 33 includes an impervious horizontal bottom wall 63, a pair of vertical end walls 65 and 67 (FIGS. 5 and 6) and a pair of upwardly and inwardly angled side walls 69 and 71 which cooperate to form a fountain chamber 72 (FIGS. 6 and 7). Referring to FIG. 5, such side walls 69 and 71 are formed on their bottom extremities with downwardly projecting support legs 73 and 75 (FIG. 5) disposed at the opposite ends thereof for supporting such fountain in the sump 31.

Disposed within the fountain 33 is a baffle system composed of three longitudinally spaced vertically extending baffles 79 and three vertically spaced horizontal baffles 81.

The housing of the pump 37 is formed in its lower extremity with a rectangularly shaped inlet 82 and in its upper extremity with a plurality of elliptically shaped inlets 83, it being noted that all such inlets 82 and 83 are disposed in the solder 45 and not in the oil 47.

Referring to FIG. 7, heaters 85 and 87 are mounted on opposite sides of the sump 31 for providing heat thereto.

The conveyor 23 may conveniently consist of a pair of parallel side beams 95 which form tracks for receipt of longitudinal chain assemblies, generally designated 97, and which include individual inwardly projecting carrying fingers 101 projecting from the individual links 106 thereof.

The circuit boards 25 may conveniently be carried from a carrier, generally designated 105, which includes a rectangularly shaped frame 107 which has an adjustment bar 111 mounted centrally therein and a biasing bar 113 mounted on one side thereof. The bars 111 and 113 are conveniently formed on their confronting sides with V-shaped notches 112 and 114 (FIG. 4) for receipt of opposite sides of the boards 25 and on their opposite ends with outwardly opening notches for sliding receipt on the frame 107.

The adjustment bar 111 includes thumb screws 117 in the opposite ends thereof for tightening such bar in position in accordance with the width of the particular circuit boards being processed. A biasing spring, generally designated 125, is mounted on one side of the frame 107 for biasing the biasing bar 113 inwardly and is formed with a pair of bowed halves 127 for urging against such biasing bar.

A fluxer 131 may be disposed under the lower end of the conveyor 23 and a pre-heater 133 disposed intermediate such fluxer and the soldering device 21. A control unit 135 is disposed adjacent the soldering device 21 and includes a control knob 137 for controlling the speed of the pump 37, as well as heater, fluxer and conveyor switches.

In operation, molten solder 45 is poured in the sump 31 to fill it above the level of the inlets 82 and 83 and the oil compound 47 added to form a layer covering the top of such solder. The circuit boards 25 may then be mounted face downwardly in the carrier 105 by pressing the biasing bar 113 outwardly and inserting the opposite edges of such boards in the confronting grooves 112 and 114. Release of the biasing bar 113 will enable the spring 125 to urge such bar inwardly toward the bar 111 to hold the boards 25 captive.

The control unit 135 may then be energized to energize the heaters 85 and 87, variable speed pump 37, pre-heater 133, fluxer 131 and conveyor 23 to commence operation. The speed of the pump 37 is adjusted by rotating the control knob 137 until the desired height of standing wave 48 is formed over the outlet 41 (FIG. 7) and the solder streams 51 spilling downwardly around the outside of the fountain 33 are of sufficient volume to carry a sufficient quantity of oil compound 47 therewith and into the inlets 82 and 83 to produce sufficient oil compound in the oil-solder mixture emitting from the fountain inlet 35 to produce the desired oil-to-solder ratio in the wave 48 over which the circuit boards 25 are being passed.

It will be appreciated that the oil compound 47 moving upwardly in the fountain chamber 72 as shown in FIG. 7 will be mixed with the solder and will tend to be buoyed toward the top thereof to form a somewhat protective film over the wave 48 to prevent oxidation of the solder and formation of froth on the wave. The oil compound 47 in the wave 48 is also transferred to the circuit board with the solder and serves to prevent adherence of an undue quantity of the solder to such circuit board to thereby prevent bridging of solder between closely spaced components and to thereby provide a well defined printed circuit.

As the carrier 105 moves upwardly along the conveyor 23, the boards will pass over the fluxer 131 to have flux applied thereto and will then pass over the preheater 133 to be finally passed over the standing wave 48 to effect soldering thereof.

In order to increase the ratio of oil to solder, it is only necessary to adjust the control knob 137 to increase the speed of the pump 37 sufficiently to cause the solder streams 51 to increase in volume sufficiently to carry a sufficient amount of oil compound 47 downwardly therewith and into the inlets 82 and 83 to produce the desired increase in ratio of oil to solder in the wave 48.

From the foregoing it will be apparent that the method of present invention provides an economical and convenient means for producing a standing wave of the desired ratio of solder to oil and for adjusting the ratio without the necessity of installing a control valve which will be exposed to the high temperature of molten solder and which may have oil caked to the seat thereof to result in a build-up of residue during operation thereby resulting in an unwanted variation in flow rate which would produce a consequent variation in ratio of oil to solder.

Various modifications and changes may be made with regard to the foregoing detailed description without departing from the spirit of the invention.

I claim:

1. A method for producing a standing wave of a mixture including intermixed solder and protective film means of a selected ratio and comprising the following steps:

placing molten solder having a relatively high specific gravity in a sump of a soldering apparatus of the type that includes a sump with a fountain disposed therein and formed in its lower portion with fountain inlet means and projecting upwardly therefrom to terminate in horizontal outlet means, said fountain cooperating with said sump to form a substantially unobstructed flow return path leading downwardly from said outlet around said fountain to said inlet means, and filling such sump with enough said solder to cover said inlet means;

placing a layer of liquid protective film having a relatively low specific gravity on said solder;

heating said solder to maintain it in its molten state;

pumping solder in through said inlet means at a rate sufficient to cause the solder emitted from said outlet means to form a wave of molten solder and then spill downwardly around said fountain through said substantially unobstructed path passing through said layer of protective film means at a rate sufficient to pull a sufficient quantity of protective film means downwardly therewith and into said inlet means to produce said desired ratio of solder and protective film means in said wave.

2. A method for producing a standing wave as set forth in claim 1 that includes:
   the step of baffling said mixture as it passes through said fountain to effect thorough intermixing of said solder and protective film means.
3. A method for producing a standing wave as set forth in claim 1 that includes:
   the step of varying said pumping rate to vary the ratio of said solder to protective film means.
4. A method for producing a standing wave as set forth in claim 2 that includes:
   the step of varying said pumping rate to vary the ratio of said solder to protective film means.
5. A method for producing a standing wave as set forth in claim 2 that includes:
   the step of heating said sump to heat said solder and protective film means.

* * * * *